United States Patent
Taylor et al.

(10) Patent No.: US 12,110,801 B2
(45) Date of Patent: Oct. 8, 2024

(54) TURBINE SHROUD SEGMENT AND ITS MANUFACTURE

(71) Applicant: Rolls-Royce plc, London (GB)

(72) Inventors: Rupert J. Taylor, Dursley (GB); Ngungunyana Mhlanga, Derby (GB); Grant Mathieson, Bristol (GB); Ryan R. Allen, Derby (GB); James Revell, Derby (GB); Dinesh Perumalsamy, Derby (GB); Carlos Javier Diaz Rodriguez, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/447,740

(22) Filed: Aug. 10, 2023

(65) Prior Publication Data

US 2024/0159165 A1    May 16, 2024

(30) Foreign Application Priority Data

Aug. 30, 2022  (GB) ...................................... 2212532

(51) Int. Cl.
*F01D 25/24*    (2006.01)
*F01D 25/12*    (2006.01)

(52) U.S. Cl.
CPC ............. *F01D 25/24* (2013.01); *F01D 25/12* (2013.01); *F05D 2260/201* (2013.01)

(58) Field of Classification Search
CPC ..... F01D 25/24; F01D 25/12; F05D 2260/201
See application file for complete search history.

(56) References Cited

U.S. PATENT DOCUMENTS

| 4,329,113 A | 5/1982 | Ayache et al. |
| 4,573,865 A * | 3/1986 | Hsia .......................... F01P 1/00 |
| | | 415/173.1 |

(Continued)

FOREIGN PATENT DOCUMENTS

| EP | 2505787 A1 | 10/2012 |
| EP | 2657451 A2 | 10/2013 |
| JP | 2024001478 A * | 1/2024 |

OTHER PUBLICATIONS

Great Britain search report dated Jan. 31, 2023, issued in GB Patent Application No. 2212532.2.

(Continued)

*Primary Examiner* — Jesse S Bogue

(57) ABSTRACT

A turbine shroud segment, e.g. for a gas turbine engine, which is coolable by a supply of cooling air, e.g. from a gas turbine engine compressor. The turbine shroud segment has a segment casing that has a radially outer surface and a radially inner surface. The segment casing houses a main plenum, a first layer of impingement chambers, a second layer of impingement chambers, and a plurality of effusion passages. The first layer of impingement chambers fluidly communicates with the main plenum via transfer passages that are formed in the segment casing. The second layer of impingement chambers fluidly communicates with the first layer of impingement chambers via impingement passages that are formed in the segment casing. The effusion passages run between impingement chamber core surface, which is a radially inner surface of an impingement chamber, and the radially inner surface of the segment casing.

18 Claims, 8 Drawing Sheets

(56) References Cited

U.S. PATENT DOCUMENTS

| | | | |
|---|---|---|---|
| 5,048,288 A * | 9/1991 | Bessette | F01D 11/24 |
| | | | 415/116 |
| 5,584,651 A * | 12/1996 | Pietraszkiewicz | F01D 25/12 |
| | | | 415/173.1 |
| 6,261,053 B1 * | 7/2001 | Anderson | F01D 25/12 |
| | | | 415/115 |
| 7,665,962 B1 | 2/2010 | Liang | |
| 9,556,795 B2 * | 1/2017 | Ryon | F23D 11/106 |
| 9,683,444 B1 * | 6/2017 | Jones | F01D 5/188 |
| 9,840,927 B2 * | 12/2017 | Tucker | F01D 5/284 |
| 9,957,811 B2 * | 5/2018 | Hucker | F01D 5/186 |
| 9,988,936 B2 * | 6/2018 | Nasr | F01D 25/12 |
| 10,422,235 B2 * | 9/2019 | Bunker | F01D 9/065 |
| 10,690,055 B2 * | 6/2020 | Stover | F02C 7/18 |
| 10,815,828 B2 * | 10/2020 | Widener | B33Y 80/00 |
| 10,822,986 B2 * | 11/2020 | Snider | F01D 11/122 |
| 10,989,068 B2 * | 4/2021 | Packer | F01D 25/12 |
| 11,525,401 B2 * | 12/2022 | Morris | F01D 5/046 |
| 11,598,222 B2 * | 3/2023 | Ratzlaff | B04C 3/06 |
| 2004/0120803 A1 | 6/2004 | Lucas et al. | |
| 2007/0048122 A1 * | 3/2007 | Van Suetendael | B01D 46/40 |
| | | | 415/115 |
| 2008/0131260 A1 | 6/2008 | Lee et al. | |
| 2011/0236188 A1 * | 9/2011 | Knapp | F01D 5/20 |
| | | | 415/173.1 |
| 2012/0027576 A1 | 2/2012 | Tibbott et al. | |
| 2012/0251295 A1 * | 10/2012 | Turner | F23R 3/002 |
| | | | 415/115 |
| 2012/0263576 A1 | 10/2012 | Lacy et al. | |
| 2014/0341711 A1 | 11/2014 | Taylor | |
| 2015/0275763 A1 * | 10/2015 | Kanjiyani | F01D 5/187 |
| | | | 415/179 |
| 2019/0079492 A1 * | 3/2019 | Bowden, Jr. | B22F 3/1115 |
| 2019/0086084 A1 | 3/2019 | Clum et al. | |
| 2019/0127283 A1 * | 5/2019 | Gonzalez | C04B 35/638 |
| 2019/0178101 A1 | 6/2019 | Synnott et al. | |
| 2019/0178102 A1 | 6/2019 | Synnott et al. | |
| 2019/0178103 A1 | 6/2019 | Synnott et al. | |
| 2020/0141246 A1 | 5/2020 | Hafner et al. | |

OTHER PUBLICATIONS

European search report dated Nov. 29, 2023, issued in EP Patent Application No. 23188033.7.

\* cited by examiner

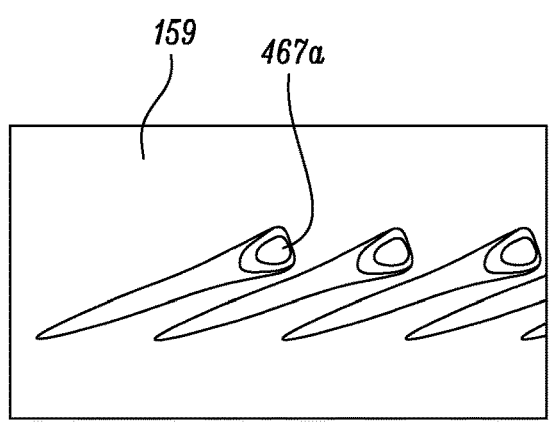
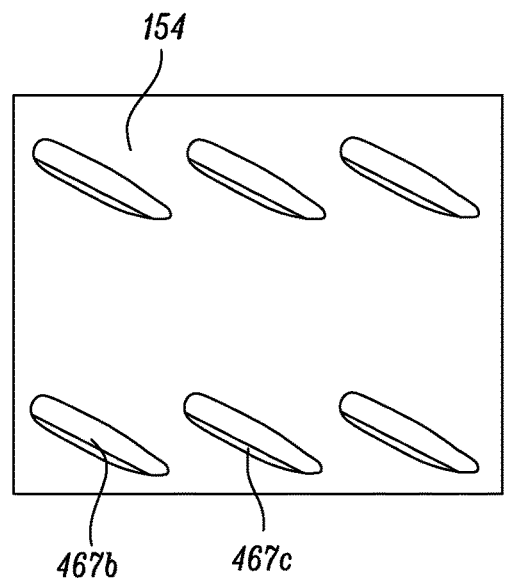
FIG. 6B    FIG. 6C
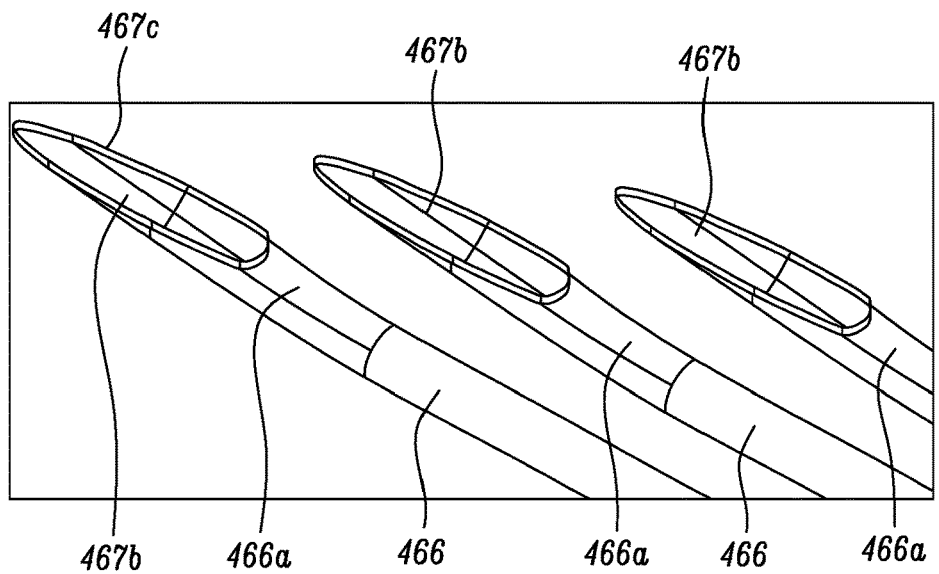
FIG. 6D

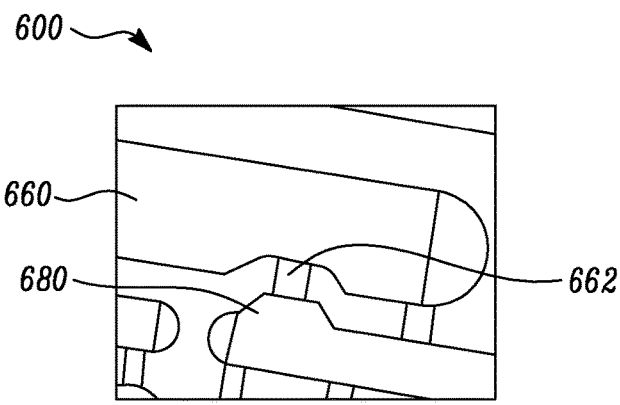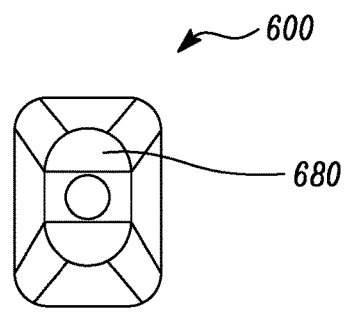
*FIG. 10A*  *FIG. 10B*
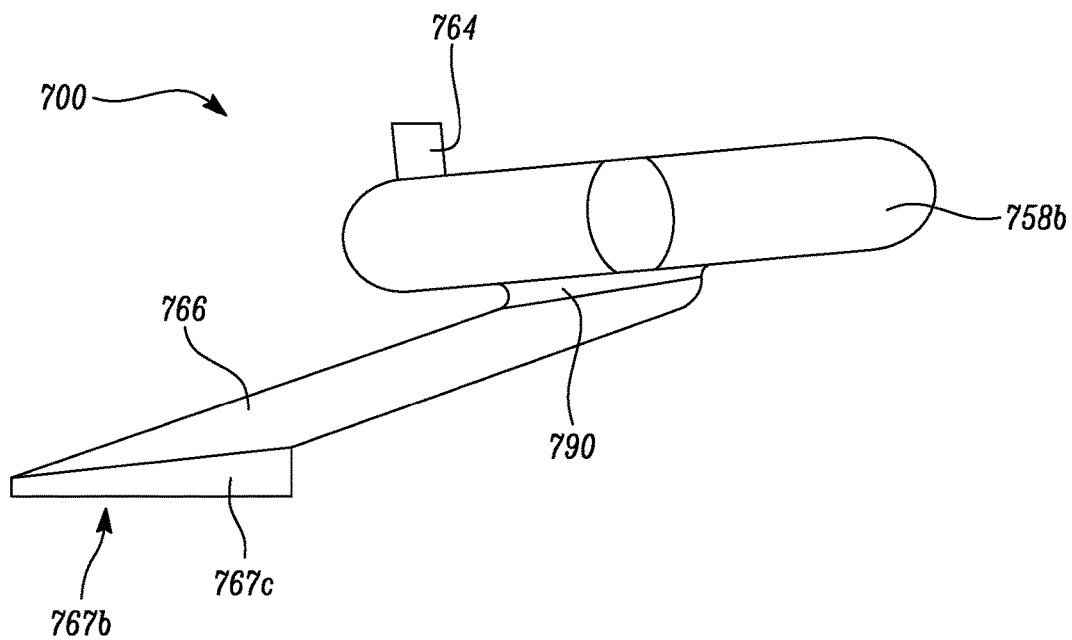
*FIG. 11*

TURBINE SHROUD SEGMENT AND ITS MANUFACTURE

CROSS-REFERENCE TO RELATED APPLICATIONS

This specification is based upon and claims the benefit of priority from United Kingdom patent application number GB 2212532.2 filed on Aug. 30, 2022, the entire contents of which is incorporated herein by reference.

BACKGROUND

Technical Field

The present disclosure relates to a turbine shroud segment, for example for a gas turbine engine, and a method of manufacturing same.

Description of the Related Art

Gas turbine engines typically have an array of turbine blades downstream from the combustion section that are driven by working fluid in the form of hot combusted gas flow. The efficiency of the engine is maximised by minimising the amount of working fluid that bypasses the turbine blades as the working fluid flows through the engine. This is typically achieved by providing an annular shroud that extends about the array of turbine blades in close radial proximity to the radially outward tips of the turbine blades. The annular shroud is typically formed from circumferentially aligned segments to avoid excessive thermal stress.

The performance of gas turbine engines, whether measured in terms of efficiency or specific output, is generally improved by increasing the turbine gas temperature. It is therefore desirable to operate the turbines at the highest possible temperature. As a result, the turbines in state of the art engines, particularly high pressure turbines, operate at temperatures which are greater than the melting point of the material of the blades and vanes making some form of cooling necessary. However, increasing cooling of components generally represents a reduction in efficiency and so much effort is spent in finding a satisfactory trade-off between turbine entry temperature, the life of a cooled turbine component and specific fuel consumption. This has led to a great deal of research and development of new component designs and materials that can enable an efficient increase of the gas turbine entry temperature.

Turbine shroud segments typically include some means for cooling them and the cooling often involves using cold air from the compressor section of the gas turbine engine. However as turbine shroud segments are exposed to extreme temperatures and abrasive contact from the rotating blades for extended periods of time they become worn and frequently need to be replaced.

There is therefore a need to provide a turbine shroud segment that overcomes or at least minimises the disadvantages and limitations of the aforementioned known turbine shroud segments or at least provides a useful alternative to known turbine shroud segments.

SUMMARY

According to a first aspect there is provided a turbine shroud segment for a gas turbine engine that has a supply of cooling air, the turbine shroud segment comprising a segment casing that has a radially outer surface and a radially inner surface;

the segment casing houses a main plenum, a first layer of impingement chambers, a second layer of impingement chambers, and a plurality of effusion passages;

the first layer of impingement chambers fluidly communicates with the main plenum via transfer passages that are formed in the segment casing;

the second layer of impingement chambers fluidly communicates with the first layer of impingement chambers via impingement passages that are formed in the segment casing; and the effusion passages run between impingement chamber core surface, which is a radially inner surface of an impingement chamber, and the radially inner surface of the segment casing;

wherein in use the main plenum receives cooling air from the supply of cooling air, the cooling air passes through the transfer passages to the first layer of impingement chambers, then through the impingement passages into the second layer of impingement chambers, and then through the effusion passages that open onto the radially inner surface of the segment casing.

In some embodiments, the segment casing houses a single main plenum, the first layer of impingement chambers comprises four to forty impingement chambers, and the second layer of impingement chambers comprises four to forty impingement chambers.

In some embodiments, the segment casing houses a single main plenum, the first layer of impingement chambers comprises six to thirty impingement chambers, and the second layer of impingement chambers comprises six to thirty impingement chambers.

In some embodiments, the segment casing has a cooling system inlet that is formed in a side of the segment casing to provide access to a particle separator that is configured to guide lower mass particles suspended in cooling air into the main plenum via a primary passage and guide higher mass particles suspended in cooling air into and along a dust passage in the segment casing that exits the segment casing via a dust outlet.

In some embodiments, the particle separator is swan-necked.

In some embodiments, the casing segment has a wall that extends into the particle separator to bifurcate cooling air flow between the primary passage and the dust passage.

In some embodiments, the effusion passages have a circular, elliptical or square cross-section.

In some embodiments, the cross-section of the effusion passages is uniform along their length.

In some embodiments, the cross-section of the effusion passages varies along their length. For example, the cross-section of each effusion passage gradually decreases along its pathway.

In some embodiments, the effusion passages are angled with respect to the radially inner surface of the segment casing.

In some embodiments, the effusion passages are angled at 1 to 15° with respect to the radially inner surface of the segment casing.

In some embodiments, the effusion passages are entered via recessed portions in the impingement chamber core surface of the segment casing.

In some embodiments, an effusion pocket wall portion is provided to thicken the entrance of the recessed portions in the impingement chamber core surface.

In some embodiments, the effusion passages are curved.

In some embodiments, the effusion passages are straight.

In some embodiments, the effusion passage has an effusion passage inlet that is formed in the impingement chamber core surface of the turbine shroud segment and an effusion passage outlet that is formed in the radially inner surface of the turbine shroud segment, the effusion passage inlet being rounded to facilitate fluid flow.

In some embodiments, the effusion passage outlet has an effusion passage outlet wall.

In some embodiments, the transfer passages and/or the impingement passages include powder removal funnels.

In some embodiments, the powder removal funnels are frustoconical in shape.

In some embodiments, the powder removal funnels have a rectangular base.

In some embodiments, an effusion passage flow collar is located between the impingement chamber and the effusion passage.

In some embodiments, the turbine shroud segment is formed as a single unitary component by an additive layer manufacturing process.

According to a second aspect there is provided a gas turbine engine that includes at least one turbine shroud segment of the first aspect.

According to a third aspect there is provided a method for manufacturing a turbine shroud segment of the first aspect, the method comprises forming a turbine shroud segment of the first aspect by additive layer manufacturing.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which:

FIG. 6B is a close-up view of part of the impingement chamber core surface of the turbine shroud segment shown in FIG. 6A showing several effusion passage inlets.

FIG. 6C is a close-up view of part of the radially inner surface of the turbine shroud segment shown in FIG. 6A showing several effusion passage outlets.

FIG. 6D is a perspective view within the turbine shroud segment shown in FIG. 6A showing parts of several effusion passages.

FIG. 10A is a close-up sectional view of a powder removal funnel that forms part of a transfer passage, e.g. of the turbine shroud segment of FIG. 9. The powder removal funnel however has a rectangular base.

FIG. 10B is a close-up plan view of the powder removal funnel shown in FIG. 10A. The rectangular shape of the base of the powder removal funnel is more clearly seen in FIG. 10B.

FIG. 11 is a close-up schematic cross-sectional view of a seventh embodiment of the turbine shroud segment of the present disclosure where an effusion passage flow collar is located between the impingement chamber and the effusion passage.

Figure 1:
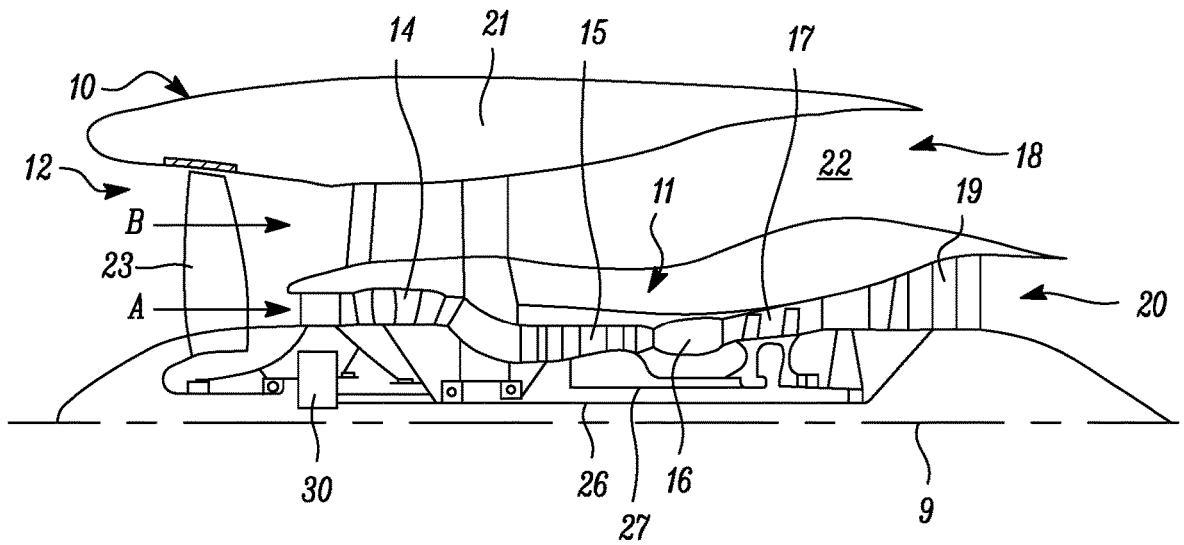
FIG. 1 is a sectional side view of a gas turbine engine.

The following table lists the reference numerals used in the drawings:

| Ref no. | Feature | FIG. |
| --- | --- | --- |
| A | Core air flow | 1 |
| B | Bypass air flow | 1 |
| 9 | Principal and rotational axis (of engine) | 1 |
| 10 | Gas turbine engine | 1 |
| 11 | Engine core | 1 |
| 12 | Air intake | 1 |
| 14 | Low pressure compressor (LPC) | 1 |
| 15 | High pressure compressor (HPC) | 1 |
| 16 | Combustion equipment | 1 |
| 17 | High pressure turbine (HPT) | 1 |
| 18 | Bypass exhaust nozzle | 1 |
| 19 | Low pressure turbine (LPT) | 1 |
| 20 | Core exhaust nozzle | 1 |
| 21 | Nacelle | 1 |
| 22 | Bypass duct | 1 |
| 23 | Fan | 1 |
| 26 | Shaft | 1 |
| 27 | Shaft | 1 |
| 30 | Epicyclic gearbox | 1 |
| 80 | Printed component | 8 |
| 81 | Baseplate | 8 |
| 82 | Powder removal passage | 8 |
| 84 | Residual powder | 8 |
| 100 | Turbine shroud segment (first embodiment) | 2 |
| 152 | Segment casing | 2 |
| 153 | Radially outer surface | 2 |
| 154 | Radially inner surface | 2 3 9A 9C |
| 158a | Impingement chamber | 2 |
| 158b | Impingement chamber | 2 |

-continued

| Ref no. | Feature | FIG. |
|---|---|---|
| 159 | Impingement chamber core surface | 2 3 9A 9B |
| 160 | Plenum | 2 |
| 162 | Transfer passage | 2 |
| 164 | Impingement passage | 2 |
| 166 | Effusion passage | 2 3 |
| 167a | Effusion passage inlet | 2 |
| 167b | Effusion passage outlet | 2 |
| 167c | Effusion passage outlet wall | 2 |
| 168 | Effusion pocket | 3 |
| 169 | Effusion pocket wall portion | 3 |
| 200 | Turbine shroud segment (second embodiment) | 4 |
| 300 | Turbine shroud segment (third embodiment) | 5 |
| 352 | Segment casing | 5 |
| 353 | Radially outer surface | 5 |
| 354 | Radially inner surface | 5 |
| 358a | Impingement chamber | 5 |
| 358b | Impingement chamber | 5 |
| 360 | Main plenum | 5 |
| 362 | Transfer passage | 5 |
| 364 | Impingement passage | 5 |
| 366 | Effusion passage | 5 |
| 368 | Cooling system inlet | 5 |
| 369 | Cooling system passage/particle separator | 5 |
| 371 | Wall | 5 |
| 373a | Primary passage | 5 |
| 373b | Dust passage | 5 |
| 375 | Dust outlet | 5 |
| 400 | Turbine shroud segment (fourth embodiment) | 6A |
| 466 | Curved effusion passage | 6A 6D |
| 466a | Flattened tube portion of curved effusion passage | 6D |
| 467a | Effusion passage inlet | 6A 6B |
| 467b | Effusion passage outlet | 6A 6C |
| 467c | Effusion passage outlet wall | 6A 6D |
| 500 | Turbine shroud segment (fifth embodiment) | 7A 7B |
| 566 | Curved effusion passage | 7A 7B |
| 566a | Flattened tube portion of curved effusion passage | 7A |
| 567a | Effusion passage inlet | 7B |
| 567b | Effusion passage outlet | 7A 7B |
| 567c | Effusion passage outlet wall | 7A 7B |
| 600 | Turbine shroud segment (sixth embodiment) | 9 |
| 658a | Impingement chamber | 9 |
| 660 | Main plenum | 9 10A |
| 662 | Transfer passage | 9 10A |
| 664 | Impingement passage | 9 |
| 680 | Powder removal funnel | 9 10A 10B |
| 700 | Turbine shroud segment (seventh embodiment) | 11 |
| 758b | Impingement chamber | 11 12 |
| 764 | Impingement passage | 11 |
| 766 | Effusion passage | 11 12 13 |
| 767b | Effusion passage outlet | 11 |
| 767c | Effusion passage outlet wall | 11 |
| 790 | Effusion passage flow collar | 11 12 13 |

DETAILED DESCRIPTION

Aspects and embodiments of the present disclosure will now be discussed with reference to the accompanying figures. Further aspects and embodiments will be apparent to those skilled in the art.

The present disclosure relates to a turbine shroud segment that is suitable for use in a gas turbine engine.

FIG. 1 illustrates a gas turbine engine 10 having a principal and rotational axis 9. The engine 10 comprises an air intake 12 and a propulsive fan 23 that generates two airflows: a core airflow A and a bypass airflow B. The gas turbine engine 10 comprises an engine core 11 that receives the core airflow A. The engine core 11 comprises, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
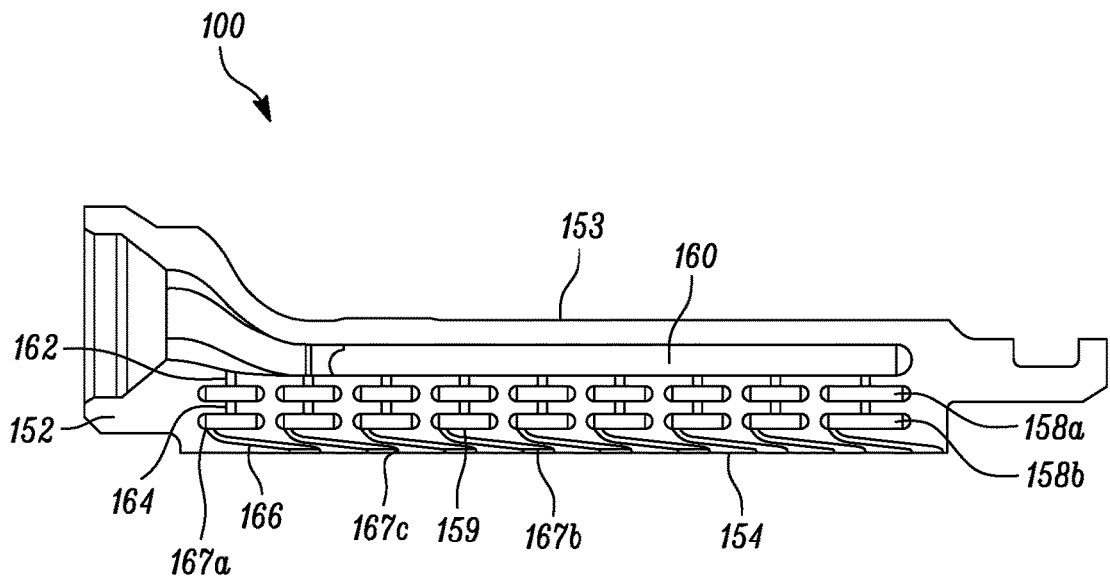
FIG. 2 is a schematic transverse cross-sectional view of a first embodiment of a turbine shroud segment of the present disclosure.

FIG. 2 shows a perspective view of a first embodiment of a turbine shroud segment of the present disclosure. The turbine shroud segment of the present disclosure has a segment casing 152 that has a radially outer surface 153 and a radially inner surface 154. The segment casing 152 houses a main plenum 160, first and second layers of impingement chambers 158a, 158b, and a plurality of effusion passages 166. The first layer of impingement chambers 158a fluidly communicates with the main plenum 160 via transfer passages 162 that are formed in the segment casing 152. The second layer of impingement chambers 158b fluidly communicates with the first layer of impingement chambers 158a via impingement passages 164 that are formed in the segment casing 152. The effusion passages 166 run between effusion passage inlets 167a formed in an impingement chamber core surface 159 (i.e. the radially inner surface of an impingement chamber 158b) of the segment casing 152 and effusion passage outlets 167b formed in the radially inner surface 154 of the segment casing 152. The effusion passage outlets 167b may include effusion passage outlet walls 167c that improve the strength of the effusion passage outlets 167b, e.g. by avoiding sharp edges. In use the main plenum 160 of the turbine shroud segment receives cooling air from the compressor section (not shown) of the gas turbine engine and the cooling air passes through the transfer passages 162 to the first layer of impingement chambers 158a, then through the impingement passages 164 into the second layer of impingement chambers 158b, and then through the effusion passages 166 that open onto the radially inner surface 154 of the segment casing 152. The radially inner surface 154 of the segment casing 152 is swept in close proximity by rapidly rotating turbine blades.

The turbine shroud segment is manufactured as a single unitary component, i.e. a single or one-piece component, by Additive Layer Manufacturing (ALM). This provides several benefits:

It enables a component complexity and functionality that cannot be realised by conventional casting or machining.

It enables improved pressure control within the various chambers of the turbine shroud segment which provides an improved cooling system, for example including the ability to fine tune flow rates of individual or rows of effusion features. Cooling can be optimised by separately adjusting cooling air flow through effusion passages on local regions of the gas washed surface of the turbine shroud segment. The ability to create multiple layers means that both impingement and film cooling can be utilised in tandem to enhance cooling performance.

By including transfer passages to meter the feed pressure, both impingement and film cooling can be utilised in tandem to give greater cooling performance; a concept known as impingement-effusion. If the feed chambers were not included the pressure drop to the film passages would have to be achieved across a single layer which would require increased passage spacing thus significantly compromising the impingement heat transfer performance.

It offers the potential to adjust cooling airflow flow through effusion features for different regions of the gas washed surface (i.e. the radially inner surface 154) thus reducing air flow consumption and improving the cooling performance.

It provides the potential for a turbine shroud segment to be a "fit-and-forget" component i.e. once fitted in a gas turbine engine, it can be relied upon to require minimal and potentially no maintenance for working life of the turbine section of the engine.

In the embodiment shown in FIG. 2 there are two layers of interconnecting impingement chambers however in other embodiments there are more layers of interconnecting impingement chambers, e.g. three, four or five layers of interconnecting impingement chambers.

The three-level system of main plenum and two layers of impingement chambers demonstrated in the embodiment shown in FIG. 2 provides an efficient film cooling on the gas washed surface of the turbine shroud segment 100. Pressures are controlled downstream of the main plenum 160 via the transfer passages 162 and the impingement passages 164. ALM allows a large number of axial impingement chambers to be created which improves the control of the pressure ratio and hence flow in the effusion passages 166. Effusion passage pressure ratios can be tailored to suit different regions of the gas washed surface, according to acoustic design rules, thus improving the cooling performance by optimising the flow rate on a row-by-row or layer-by-layer basis.

The transfer passages 162 can be formed in any suitable shape for their purpose. For example, they can have a circular, elliptical or square cross-section and the dimensions can be fixed or they can vary along the pathway of the transfer passages. In some embodiments, the transfer passages have a circular cross-section that is fixed along the pathway of the transfer passages. In some embodiments, the transfer passages have a circular cross-section but the diameter of each transfer passage gradually decreases along its pathway towards the first layer of impingement chambers. In some embodiments, the number and/or the shape of the transfer passages differs between impingement chambers. In some embodiments, the transfer passages are angled or curved to change the flow direction from the main plenum into the first layer of impingement chambers.

The impingement passages 164 can be formed in any suitable shape for their purpose. For example, they can have a circular, elliptical or square cross-section and the dimensions can be fixed or they can vary along the pathway of the impingement passages. In some embodiments, the impingement passages have a circular cross-section that is fixed along the pathway of the impingement passages. In some embodiments, the impingement passages have a circular cross-section but the diameter of each impingement passage gradually decreases along its pathway towards the second layer of impingement chambers. In some embodiments, the number and/or the shape of the impingement passages differs between impingement chambers. In some embodiments, the impingement passages are angled or curved to change the flow direction from the first layer of impingement chambers into the second layer of impingement chambers.

The effusion passages 166 can be formed in any suitable shape for their purpose. For example, they can have a circular, elliptical or square cross-section and the dimensions can be fixed or they can vary along the pathway of the effusion passages. The effusion passages can be angled, as shown in FIG. 2, in order to minimise the segment substrate metal volume and thickness to improve internal convective cooling. The steep passage angle projects the film trajectory close to the gas washed surface improving the film effectiveness. In some embodiments, the effusion passages have a circular cross-section that is fixed along the pathway of the effusion passages. In some embodiments, the effusion passages have a circular cross-section but the diameter of each effusion passage gradually decreases along its pathway towards the radially inner surface 154 of the segment casing 152. In some embodiments, the number and/or the shape of the effusion passages differs between impingement chambers. In some embodiments, one or both ends of the effusion passages is profiled to enhance fluid through into or out of the effusion passages.

Figure 3:
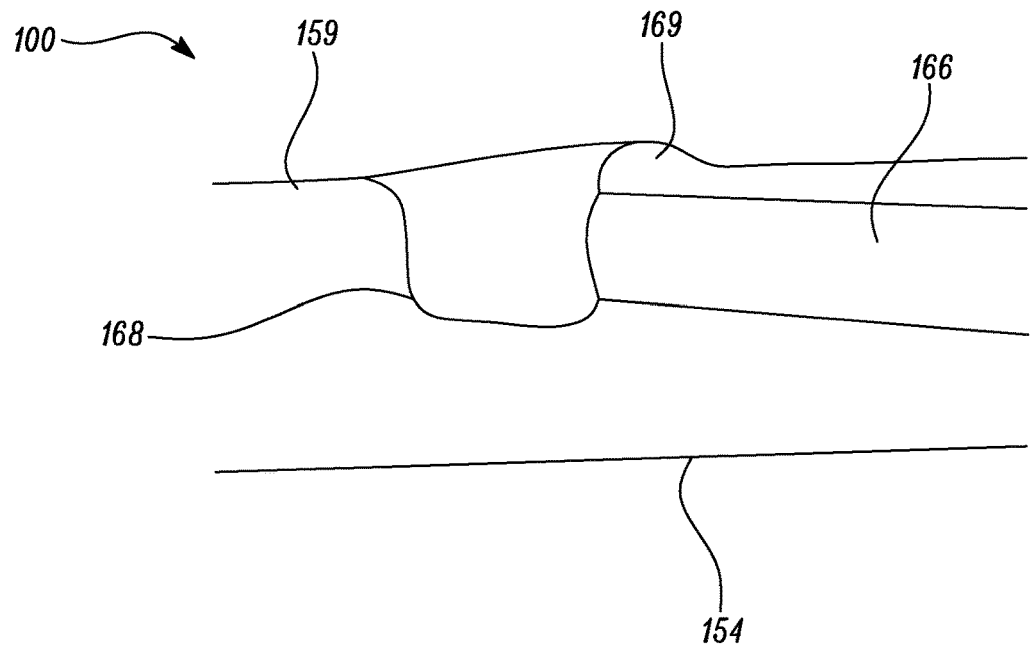
FIG. 3 is a cross-sectional view of a feed-pocketed effusion passage formed between the impingement chamber core surface and the radially inner surface of the first embodiment of the turbine shroud segment of present disclosure.

FIG. 3 is a cross-sectional view of a feed-pocketed effusion passage formed between the impingement chamber core surface 159 and the radially inner surface 154 of the first embodiment of the turbine shroud segment of present disclosure. This is described in more detail below.

As mentioned above effusion passages are passages through which cooling air leaves the segment casing of a turbine shroud segment thereby washing the radially inner surface 154 of the turbine shroud segment with cooling air. Effusion passages are typically provided in an array and are typically formed as cylindrical passages that are angled with respect to the radially inner surface of the turbine shroud segment in order to substantially wash the entire radially inner surface with cooling air.

Conventional effusion passages are drilled into the segment casing using a traditional machining method such as electrode discharge machining (EDM). In order to avoid electrode "skid", i.e. the electrode unintentionally moving on the surface being worked upon, the minimum drilling angle to the surface is usually limited to about 20°. With such an angle, acoustically optimised film passage lengths can only be achieved by increasing the thickness of the wall adjacent to the gas path thereby compromising the internal convective performance.

Additive layer manufacture however enables the turbine shroud segment of the present disclosure much greater flexibility in the provision and geometry of effusion passages and therefore permits greater optimisation of cooling flow management.

Some embodiments of the turbine shroud segment of the present disclosure have feed-pocketed effusion passages as depicted in FIG. 3. A feed-pocketed effusion passage has an effusion pocket 168 that is a recessed portion formed within the impingement chamber core surface 159 of an impingement chamber, more particularly an impingement chamber of the second layer of impingement chambers 158b.

Feed-pocketed effusion passages enable a highly angled effusion passage (i.e. the passage is less than 20°, e.g. 1 to 15°, with respect to the radially inner surface) to be provided in the turbine shroud segment without the need for an elliptical break-in shape to be formed on the radially inner surface of the turbine shroud segment. Consequently it is possible to minimise the thickness of the wall adjacent to the gas path thereby improving internal cooling system convective performance. Additive layer manufacture enables the formation of these feed-pocketed effusion passage.

In a traditionally cast design the effusion passages would be machined using electrode discharge machining (EDM) or laser machining. The break-in/out surface geometry feature shape is a function of the tool form and for angled circular passages it is typically elliptical in shape. For highly angled passages the elliptical 'break-in' geometry occupies a large amount of space within the impingement chamber and therefore constrains the positioning of any bulkheads that are provided.

The effusion pocket can take various forms suitable for its function. In some embodiments the effusion pocket is substantially cylindrical, although the edges may be rounded to facilitate air flow as shown in FIG. 3.

An effusion pocket wall portion 169 may be provided as a form of local wall thickening around part of the entrance of the effusion pocket 168. It provides smooth flow entry into the effusion pocket 168 and then into the effusion passage 166 itself. It helps to provide structural integrity e.g. by avoiding using thin ligaments. It also reduces sagging during additive layer manufacture.

The complexity of the geometry of the feed-pocketed effusion passage shown in FIG. 3 could not be envisaged using conventional machining methods however it is possible using additive layer manufacturing.

In an ALM design it is possible to create 'break-in' geometries, e.g. feed pockets, to enable the supply of cooling air, independent of the cooling feature itself thereby reducing the space occupied by elliptical features of traditionally machined passages. Feed-pocketed effusion passages reduce the axial distance required inside the turbine shroud segment and enable more internal chambers to be created within a given geometry. This reduces cooling flow consumption by enabling cooling features to be fed from separate chambers and with different pressures and making it possible to tune the pressure ratios for individual film rows.

The shaping and profiling of the effusion passages 166 of the turbine shroud segment of the present disclosure features in several embodiments to be described later on.

Figure 4:
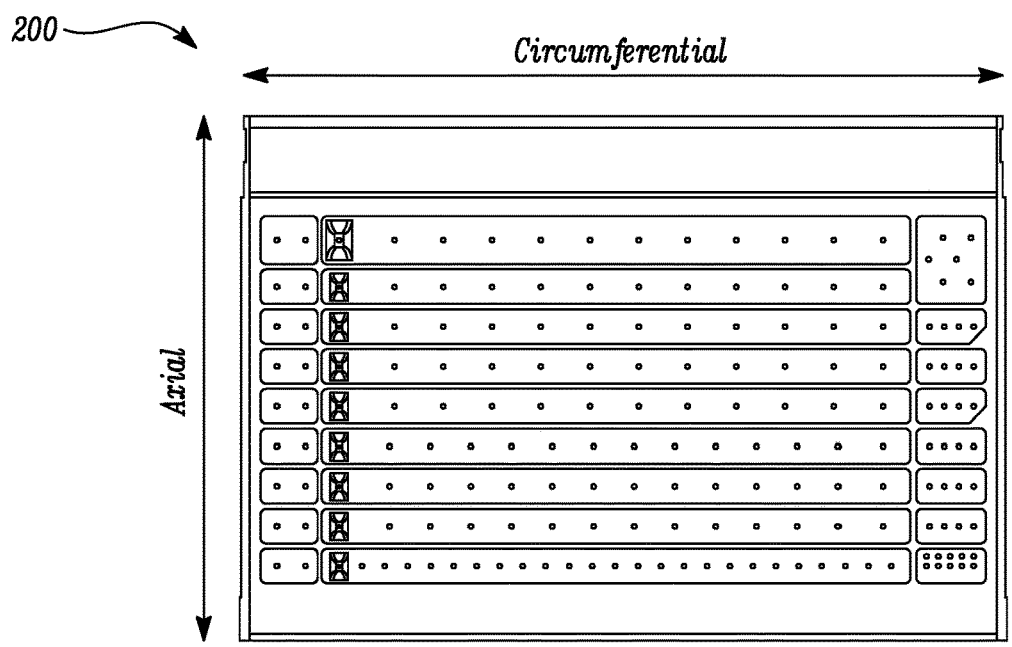
FIG. 4 is a schematic cross-sectional view of a second embodiment of a turbine shroud segment of the present disclosure showing the general layout of its impingement chambers.

FIG. 4 is a schematic representation of a second embodiment of a turbine shroud segment 200 of the present disclosure. The figure shows the general layout of its internal chambers with respect to their axial or circumferential orientation. More specifically it is a plan view of the internal chambers in a section through a layer of impingement passages. The figure illustrates how both the number of axial and circumferential chambers can be altered to suite the design. For example, more axial chambers can be added (depending on the number of films rows) to more effectively control the flow rate as there is a steep gas path pressure gradient from front to back of the turbine shroud segment. More circumferential chambers mean that feed pressures to local patches of effusion films can be controlled to suit acoustic design rules where lengths of the effusion films have to be adjusted to fit into the geometry, for example close to the edges of the component.

Figure 5:
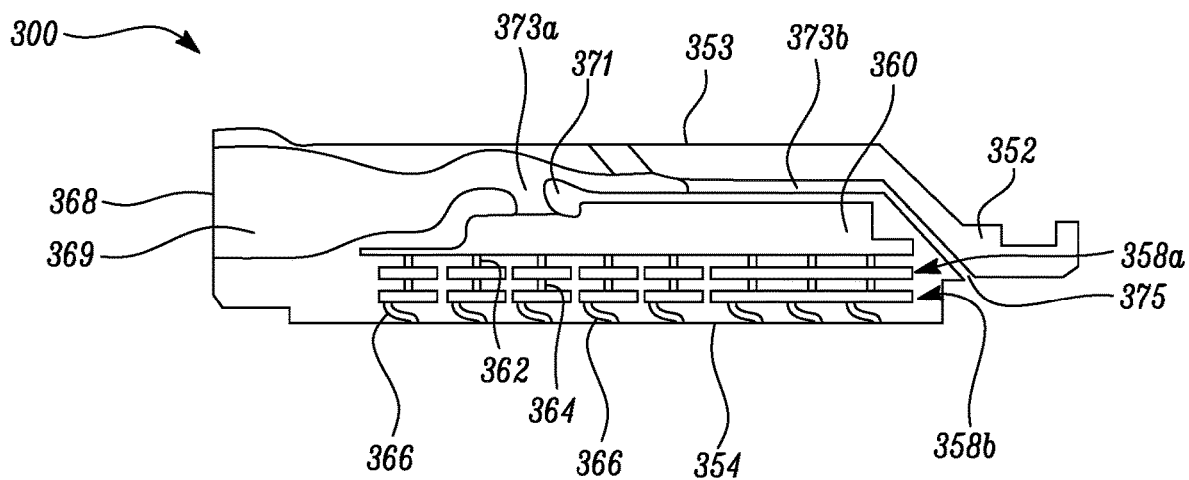
FIG. 5 is a schematic cross-sectional view of a third embodiment of a turbine shroud segment of the present disclosure. This embodiment includes a swan-neck particle separator.

FIG. 5 is a schematic cross-sectional view of a third embodiment 300 of a turbine shroud segment of the present disclosure. This embodiment has a segment casing 352 that has a radially outer surface 353 and a radially inner surface 354. The segment casing 352 houses a main plenum 360 and a first layer and a second layer of impingement chambers 358a, 358b.

The third embodiment 300 of the turbine shroud segment of the present disclosure has a cooling system inlet 368 that is formed in a side of the segment casing 352 to provide access to a particle separator 369 that is configured to guide lower mass particles suspended in cooling air into the main plenum 360 via a primary passage 373a and guide higher mass particles suspended in cooling air into and along a dust passage 373b in the segment casing that exits via a dust outlet 375. In this embodiment the particle separator is swan-necked to effectively and efficiently fulfil its function. A wall 371 extends into the particle separator to bifurcate the cooling air between the primary passage 373a and the dust passage 373b.

The first layer of impingement chambers 358a fluidly communicates with the main plenum 360 via transfer passages 362 that are formed in the segment casing 352. The second layer of impingement chambers 358b fluidly communicates with the first layer of impingement chambers 358a via impingement passages 364 that are formed in the segment casing 352. Effusion passages 366 are formed in the radially inner surface 354 of the segment casing 352 and are fluidly connected to the second layer of impingement chambers 358b. In use cooling air from the compressor section (not shown) of the gas turbine engine enters cooling system inlet 368 of the turbine shroud segment 300. Most of the cooling air enters the main plenum 360 via the primary passage 373a however some of the cooling air, typically transporting any sand or dust particles passes into and through the dust passage 373b and out through the duct outlet 375. Cooling air within the main plenum 360 of the turbine shroud segment 300 passes through the transfer passages 362 to the first layer of impingement chambers 358a, then through the impingement passages 364 into the second layer of impingement chambers 358b, and then through the effusion passages 366 that open onto the radially inner surface 354 of the segment casing 352. The radially inner surface 354 of the segment casing 352 is swept in close proximity by rapidly rotating turbine blades.

The particle separator, particularly when swan-necked, uses the principal of momentum differences between sand, dust and the air stream to separate larger size higher mass debris from the air entering the cooling system of the turbine shroud segment. Removing sand and dust particles from the cooling air gives greater flexibility on the size of features employed in the cooling design by eliminating the risk of blockage. Reducing passages in impingement or impingement-effusion style systems allows improved distribution of air for a given mass flow rate and consequently enhances cooling system performance. The ratio of cooling system to by-pass air can be changed depending on the requirements for particle separation.

Separating and filtering out sand and dust in this way means geometric features, particularly impingement or effusion passages, are less likely to be blocked and so they can be smaller than otherwise possible, thereby enhancing the performance of the cooling system of the turbine shroud segment and reducing the consumption of secondary air.

Figure 6A:
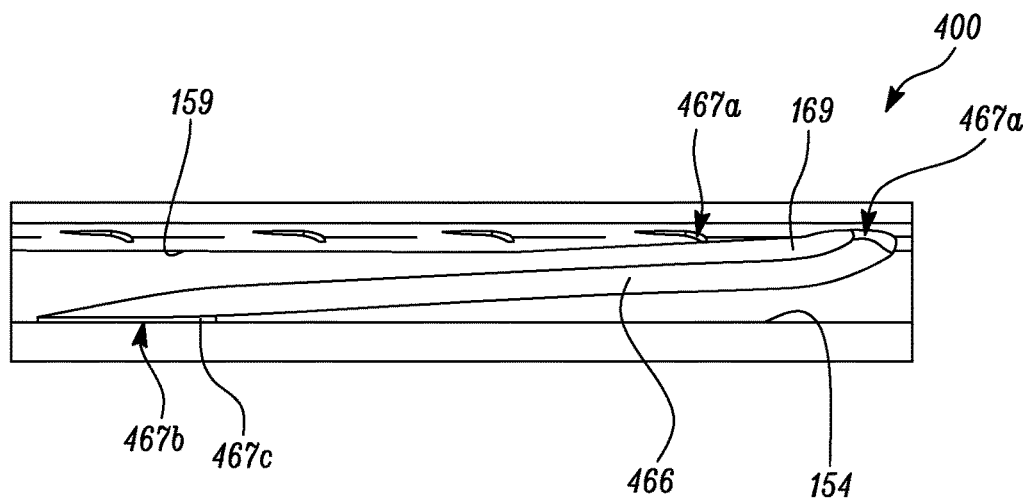
FIG. 6A is a cross-sectional view of a curved effusion passage formed between the impingement chamber core surface and the radially inner surface of a fourth embodiment of the turbine shroud segment of present disclosure.

FIG. 6A is a cross-sectional view of a curved effusion passage 466 formed between the impingement chamber core surface 159 and the radially inner surface 154 of a fourth embodiment 400 of the turbine shroud segment of present disclosure.

As mentioned above effusion passages are passages through which cooling air leaves the segment casing of a turbine shroud segment thereby washing the radially inner surface 154 of the turbine shroud segment with cooling air. Conventional effusion passages are drilled into the segment casing using a traditional machining method). In order to avoid electrode "skid", i.e. the electrode unintentionally moving on the surface being worked upon, the minimum drilling angle to the surface is usually limited to about 20°. As effusion passages are typically formed by drilling, they are typically straight.

Some embodiments of the turbine shroud segment of the present disclosure, including the fourth embodiment 400, have curved effusion passages 466 as depicted in FIG. 6A. In use cooling air enters the curved effusion passage 466 through an effusion passage inlet 467a that is formed in the impingement chamber core surface 159 of the turbine shroud segment and leaves the curved effusion passage 466 through an effusion passage outlet 467b that is formed in the radially inner surface of the turbine shroud segment. The effusion passage inlet 467a has an effusion pocket wall portion 169 that thickens the entrance to the effusion passage inlet 467a to improve the structural integrity of the effusion passage inlet 467a, e.g. by avoiding thin ligaments. The effusion pocket wall portion is raised and rounded to facilitate fluid flow and minimise any fluid entry pressure loss. It also reduces sagging during additive layer manufacture. The effusion passage outlet 467b is swept, e.g. elliptical in shape, which assists the radially inner surface 154 to be smoothly gas washed. The effusion passage outlet 467b may include effusion passage outlet walls 467c that improve the strength of the effusion passage outlets 467b, e.g. by avoiding sharp edges.

This geometry was created in order to minimise the radial height occupied by an effusion passage whilst maintaining a given centreline length for purposes of acoustic tuning. Optimum acoustic tuning prevents hot gas ingestion at lower pressure ratios thereby helping to reduce the consumption of cooling air. By curving the effusion passage the correct acoustic length can be achieved whilst reducing the elliptical footprint on the impingement chamber core surface 159, more particularly an impingement chamber of the second layer of impingement chambers 158b.

The curved geometry of the curved effusion passage 466 shown in FIG. 6A could not be envisaged using conventional machining methods however it is possible using additive layer manufacturing. Its design exploits advantages of additive layer manufacture to meet requirements of both convection cooling and effusion film cooling on turbine shroud segments. The cooling passage axis is curved in accordance with the surfaces on both sides to achieve the correct acoustic length whilst keeping the wall thickness to a minimum. This reduces the surface angle toward the cooling supply and outlet surface and avoids re-entrance of the film passage into the radially inner surface 154 of the turbine shroud segment, i.e. the gas washed surface. Consequently, the angle of the passage axis to the gas washed surface at the effusion passage outlet 467b is increased thereby reducing the break-out foot print and enabling more films to be positioned in the surrounding geometry to help reduce metal temperatures as necessary. Reduced skin thickness is therefore achieved which gives improved convection performance. Achieving the correct acoustic length allows optimal pressure ratios to be used thereby mitigating against any unsteady hot gas ingestion and enabling reduced cooling flow rates.

A higher angle at the gas washed surface gives rise to a reduced 'break-out' foot print which enables cooling passages to be positioned closer to turbine shroud segment edges for example. Also it allows the pitch of any downstream passages to be smaller.

FIG. 6B is a close-up view of part of the impingement chamber core surface 159 of the turbine shroud segment 400 shown in FIG. 6A showing several effusion passage inlets 467a.

FIG. 6C is a close-up view of part of the radially inner surface 154 of the turbine shroud segment 400 shown in FIG. 6A showing several effusion passage outlets 467b.

FIG. 6D is a perspective view from below of several effusion passages 466 of the turbine shroud segment 400 shown in FIG. 6A that terminate as effusion passage outlets 467b. Each effusion passage 466 shown has a flattened tube portion 466a. Such a profiling allows the passage flow area to be maintained and controls the size and asymmetric elliptical shape of the effusion passage outlet. Each effusion passage outlet 467b shown has an effusion passage outlet wall 467c, which improves component strength.

Figure 7A:
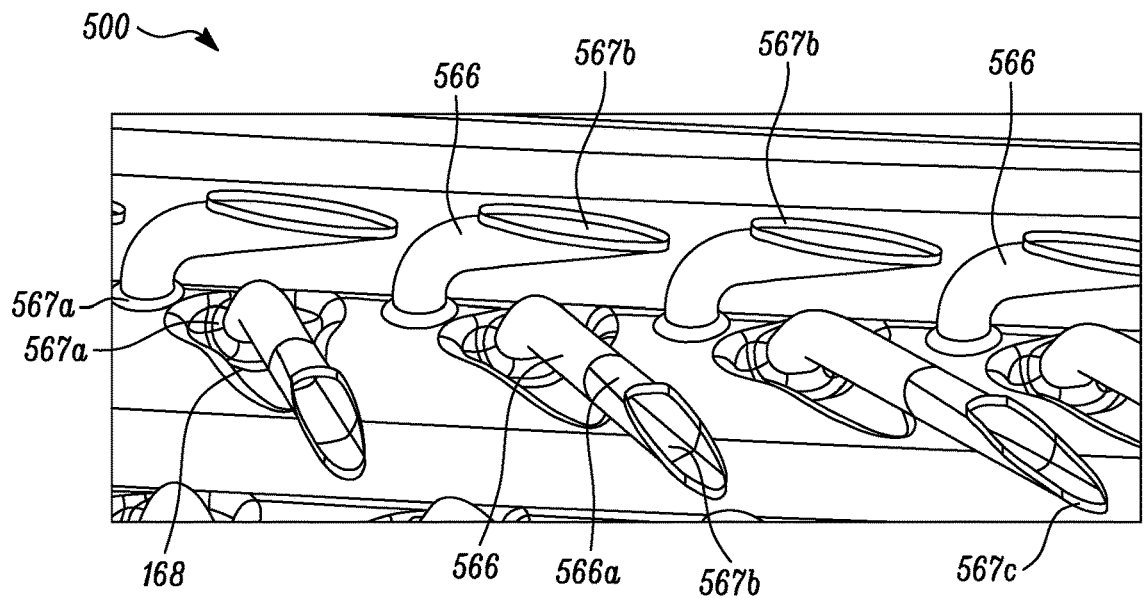
FIG. 7A is a close-up partially cutaway perspective view from below of several curved and angled effusion passages and effusion passage outlets 567b of a fifth embodiment of the turbine shroud segment of the present disclosure.

FIG. 7A is a close-up partially cutaway perspective view from below of several curved and angled effusion passages 566 and effusion passage outlets 567b of a fifth embodiment 500 of the turbine shroud segment of the present disclosure. The effusion passage outlets 567b are formed in the radially inner surface 154 of the turbine shroud segment and are elliptical in shape. Each effusion passage outlet 567b shown has an effusion passage outlet wall 567c. Each effusion passage 566 shown has a flattened tube portion 566a. Some of the effusion passages 566 are feed-pocketed.

Figure 7B:
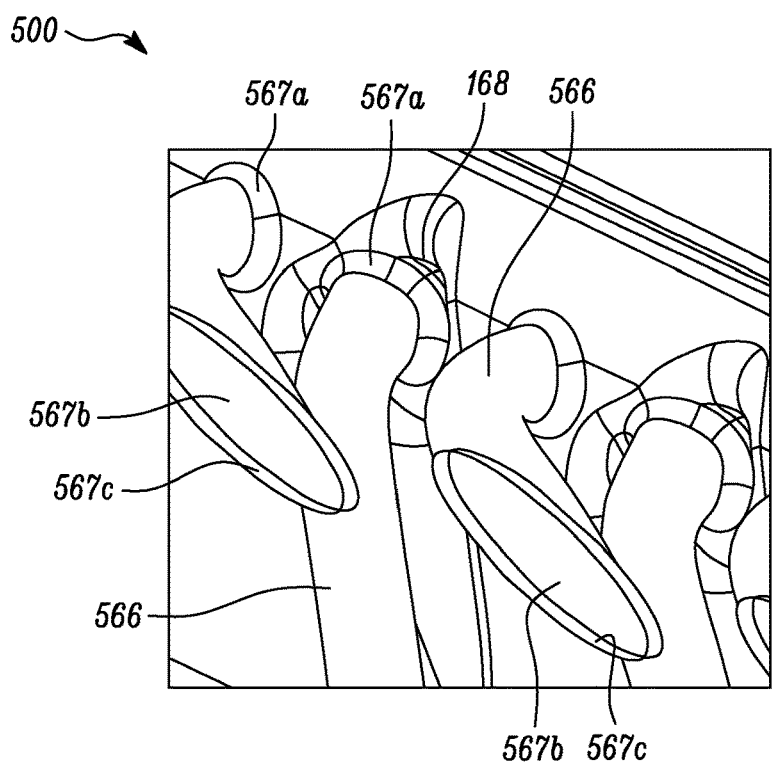
FIG. 7B is a close-up partially cutaway perspective view from below of several curved and angled effusion passages and several effusion passage outlets of the fifth embodiment of the turbine shroud segment of the present disclosure.

FIG. 7B is a further close-up partially cutaway perspective view from below of several curved and angled effusion passages 566 and several effusion passage outlet 567b of the fifth embodiment of the turbine shroud segment of the present disclosure. Each effusion passage outlet 567b shown has an effusion passage outlet wall 567c. Some of the effusion passages 566 shown are feed-pocketed i.e. they have an effusion pocket 168.

The fifth embodiment of the turbine shroud segment of the present disclosure has curved effusion passages 566 however the effusion passages are shorter in length and more tightly curved than the curved effusion passages 466 of the fourth embodiment that is depicted in FIG. 6A. FIGS. 7A and 7B show how curved effusion passages are formed in close proximity with other curved effusion passages and other cooling features.

The geometry of the curved effusion passages 566 shown avoids clashes with other features in close proximity whilst achieving a desired exit flow angle on the gas washed radially inner surface of the turbine shroud segment 500. To maintain a certain exit flow angle to the gas washed surface a straight cooling passage would clash with adjacent cooling features which cannot be moved due to space constraints.

This embodiment utilises curved effusion passages 566 which once again could not be envisaged using conventional machining methods however is possible using additive layer manufacturing. The use of short and tightly curved effusion passages 566 enables more effusion passages to be formed in the turbine shroud segment therefore increasing the heat transfer surface areas in the turbine shroud segment and thereby improving the cooling system performance.

Various technologies are known for manufacturing parts including gas turbine engine components. Such parts are made from multiple layers of powdered material and the printed part typically retains some residual powder. That residual powder is desirably removed. This is especially important where the powder is a metal powder that in some instances may be carcinogenic, flammable or explosive.

Figure 8:
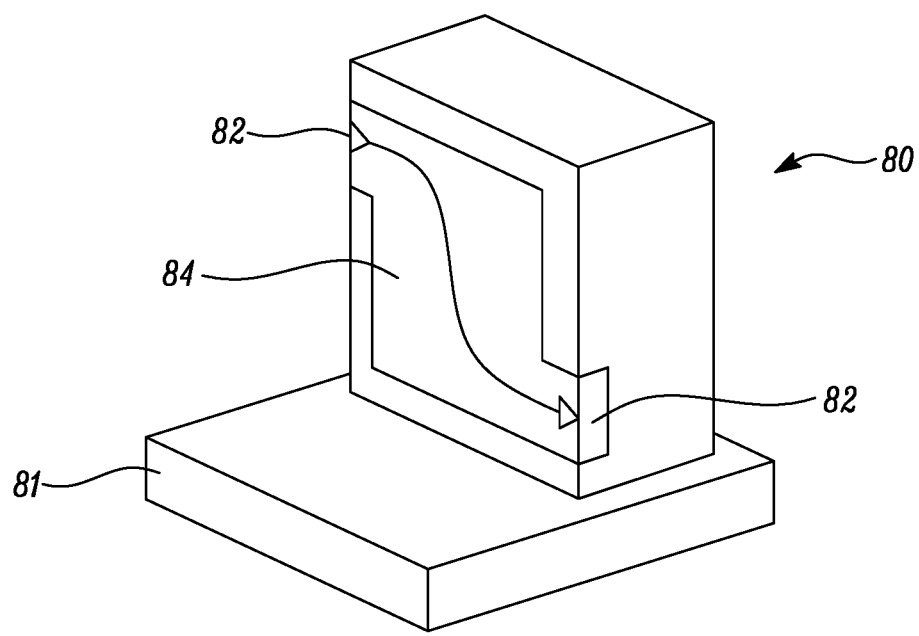
FIG. 8 depicts a known method for removing powder from a component manufactured by an additive layer manufacturing technique.

FIG. 8 depicts a known method for removing powder from a component manufactured by an additive layer manufacturing technique. In that method a printed component 80, which is supported on a baseplate, has a recess that contains some residual power 84 that should be removed. The printed component 80 has powder removal passages 82 through which residual power 84 can be removed from the printed component. The powder removal passages are typically positioned so that gravity assists in the removal of the residual powder 84 from the printed component 80. The residual powder may be flushed from the component using a high pressure wash. That is especially useful to avoid residual powder adhering to or being trapped within small passageways. For printed components that are to be hot isostatic pressed any residual powder should be removed before that pressing else powder will be consolidated within the final component. The powder removal passages 82 provided in the printed component are typically at least 2 mm in diameter to ensure maximal powder removal.

In complex cooling geometries, such as those within turbine shroud segments it is often the case that multiple layers of chambers make the effective removal of residual powder more challenging than simple components. Providing large transfer and impingement passages between chambers would assist with that removal however it would compromise the cooling system performance of the turbine shroud segment.

Figure 9:
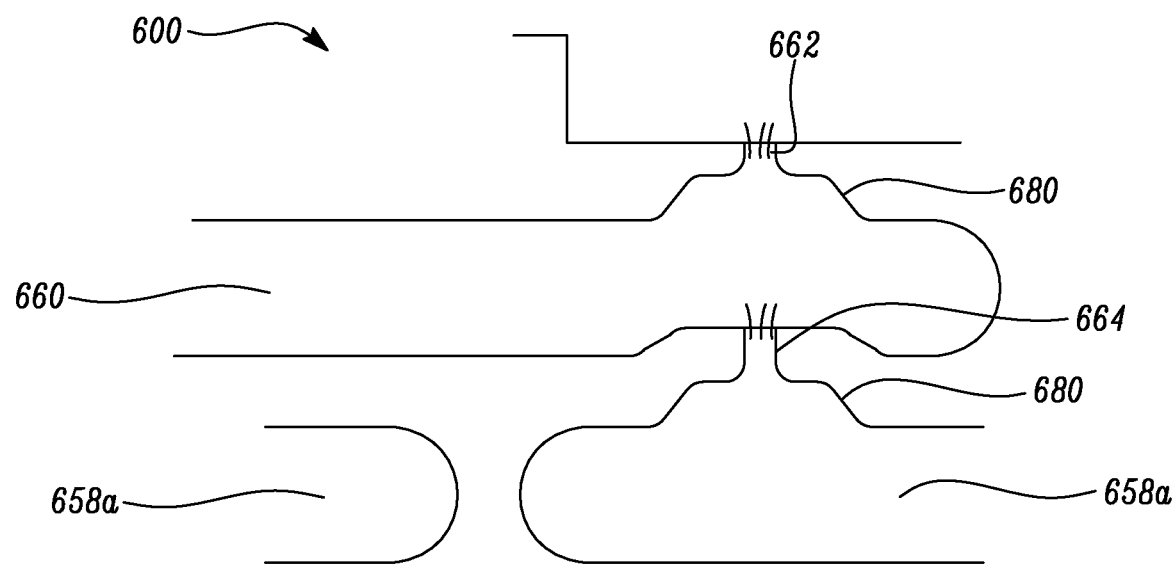
FIG. 9 is a close-up schematic cross-sectional view of a sixth embodiment of a turbine shroud segment of the present disclosure where the transfer passages and impingement passages include powder removal funnels.

FIG. 9 is a close-up schematic cross-sectional view of a sixth embodiment of a turbine shroud segment of the present disclosure. This embodiment includes all of the features of the first embodiment shown in FIG. 2 except the transfer passages and the impingement passages include powder removal funnels 680 that assist in the effective removal of any residual powder. Transfer passage 662 is a single large passage in the radially outer surface of the casing that is connected to the main plenum 660. Lower larger chambers have multiple funnels and smaller chambers have single funnels.

The powder removal funnels 680 can take various forms for their purpose. In FIG. 9 the powder removal funnels 680 are simply frustoconical in shape.

FIG. 10A is a close-up sectional view of such a powder removal funnel 680, e.g. of the turbine shroud segment of FIG. 9, that leads to a transfer passage 662.

FIG. 10B is a close-up plan view of the powder removal funnel shown in FIG. 10A, which has a shape that resembles that of a cottage-roof, i.e. frustoconical.

The powder removal funnels 680 encourage residual powder to move from chamber to chamber within the turbine shroud segment and eventually out of the component altogether. They may be positioned centrally on the chambers so that the residual powder naturally flows out of the component at particular orientations.

The complexity of the geometry of the powder removal funnels 680 shown in FIGS. 9, 10A and 10B could not be envisaged using conventional machining methods however it is possible using additive layer manufacturing. The provision of powder removal funnels 680 in the turbine should segment is suitably subtle so as not to compromise the flow of cooling air through the turbine shroud segment.

FIG. 11 is a close-up schematic cross-sectional view of a seventh embodiment of the turbine shroud segment of the present disclosure. This embodiment includes all of the features of the first embodiment shown in FIG. 2 except an effusion passage flow collar 790 is located between the impingement chamber 758*b* and the effusion passage 766.

The effusion passage flow collar 790 serves to guide cooling air flow into the effusion passage 766 and out through the radially inner surface 154 of the turbine shroud segment 700. It also serves to accommodate a low angled effusion passage whilst avoiding other cooling features in the turbine shroud segment.

The effusion passage flow collar 790 can take various forms for its aforementioned purpose. It is typically generally racetrack-shaped as it corresponds to the angled end of a typically cylindrical effusion passage.

The effusion passage 766 has an effusion passage outlet 767*b* that has an effusion passage outlet wall 767*c* that improves the strength of the effusion passage.

Figure 12:
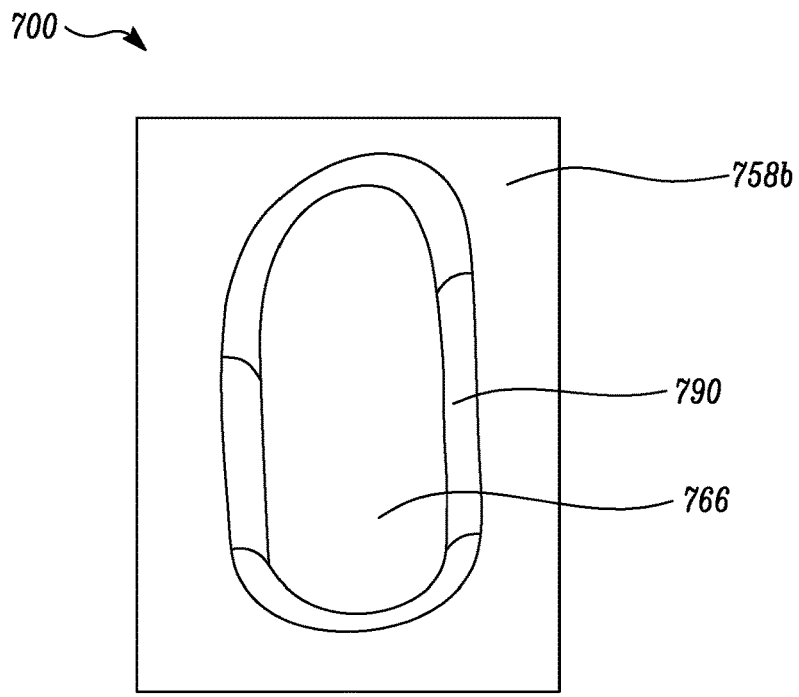
FIG. 12 is a plan view of the effusion passage flow collar shown in FIG. 11.

FIG. 12 is a plan view of the effusion passage flow collar shown in FIG. 11. The ends of the effusion passage flow collar 790 shown in FIGS. 11 and 12 are rounded-off or "bull-nosed" to provide smooth pathways for the cooling air that passes through them in use. The shape of the effusion passage flow collar may also provide structural strength for the turbine shroud segment generally and effusion passages and the impingement chambers specifically, e.g. by reducing local material stresses.

The provision of effusion passage flow collars in conjunction with effusion passages and impingement chambers enables the supply of cooling air to features within turbine shroud segments of the present disclosure that need to be tightly clustered thus providing improved cooling system performance. Such a clustering is depicted in FIG. 13.

Figure 13:
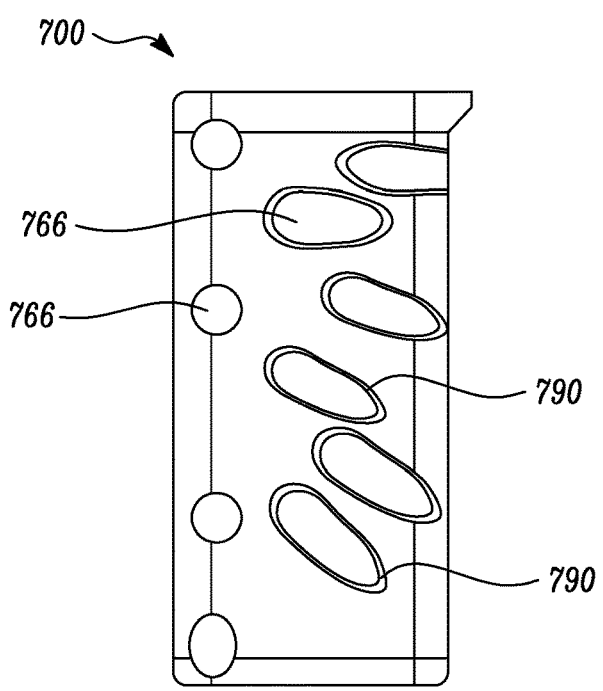
FIG. 13 is a close-up view of part of the radially inner surface of the turbine shroud segment shown in FIG. 11 showing a clustering of effusion passage flow collars and effusion passages.

The complexity of the geometry of the effusion passage flow collar 790 shown in FIGS. 11, 12 and 13 could not be envisaged using conventional machining methods however it is possible using additive layer manufacturing.

The present disclosure provides a method for manufacturing a turbine shroud segment. The method comprises forming a turbine shroud segment of the present disclosure by additive layer manufacturing. Additive Layer Manufacturing involves building a three-dimensional object from a computer-aided design (CAD) model, usually by successively adding material layer by layer. This is in contrast to conventional casting, forging and machining processes, where material is removed from a stock item (subtractive manufacturing) or poured into a mold and shaped by means of dies, presses and hammers.

Various technologies are known for manufacturing articles including gas turbine engine components. These articles are typically manufactured as single unitary (i.e. one-piece) articles.

The flexibility of Additive Layer Manufacturing enables the turbine shroud segment of the present disclosure to be designed and made with optimised thermal, vibration and impact load stress relief for a wide variety of purposes.

As evident from the above, turbine shroud segments of the present disclosure can take a variety of forms and can be manufactured to meet a variety of needs.

One skilled in the art can choose a material that is suitable to meet the service requirements for the turbine shroud segment. For example, the material may comprise one or more of titanium, a titanium alloy, steel, a steel alloy, aluminium, an aluminium alloy and a nickel-based superalloy.

While the turbine shroud segment of the present disclosure has been described with reference to embodiments that are suitable for use in gas turbine engines, for example gas turbine aircraft engines, it should be understood that the turbine shroud segment of the present disclosure could be used in high efficiency cooling systems in gas turbine applications in aerospace, marine and energy sectors.

It will be understood that the invention is not limited to the embodiments above-described and various modifications and improvements can be made without departing from the concepts described herein within the scope of the following claims.

We claim:

1. A turbine shroud segment for a gas turbine engine that has a supply of cooling air, the turbine shroud segment comprising:
   a segment casing that has a radially outer surface and a radially inner surface;
   the segment casing houses a main plenum, a first layer of impingement chambers, a second layer of impingement chambers, and a plurality of effusion passages;
   the first layer of impingement chambers fluidly communicates with the main plenum via transfer passages that are formed in the segment casing;
   the second layer of impingement chambers fluidly communicates with the first layer of impingement chambers via impingement passages that are formed in the segment casing; and
   the effusion passages run between impingement chamber core surface, which is a radially inner surface of an impingement chamber, and the radially inner surface of the segment casing;
   wherein in use the main plenum receives cooling air from the supply of cooling air, the cooling air passes through the transfer passages to the first layer of impingement chambers, then through the impingement passages into the second layer of impingement chambers, and then through the effusion passages that open onto the radially inner surface of the segment casing;
   wherein the segment casing has a cooling system inlet that is formed in a side of the segment casing to provide access to a particle separator that is configured to guide lower mass particles suspended in cooling air into the main plenum via a primary passage and guide higher mass particles suspended in cooling air into and along a dust passage in the segment casing that exits the segment casing via a dust outlet; and
   wherein the particle separator is swan-necked.

2. The turbine shroud segment of claim 1, wherein the segment casing houses a single main plenum, the first layer of impingement chambers comprises four to forty impingement chambers, and the second layer of impingement chambers comprises four to forty impingement chambers.

3. The turbine shroud segment of claim 2, wherein the segment casing houses a single main plenum, the first layer of impingement chambers comprises six to thirty impingement chambers, and the second layer of impingement chambers comprises six to thirty impingement chambers.

4. The turbine shroud segment of claim 1, wherein the casing segment has a wall that extends into the particle separator to bifurcate cooling air flow between the primary passage and the dust passage.

5. The turbine shroud segment of claim 1, wherein the effusion passages have a circular, elliptical or square cross-section.

6. The turbine shroud segment of claim 1, wherein the cross-section of the effusion passages is uniform along their length.

7. The turbine shroud segment of claim 1, wherein the effusion passages are angled with respect to the radially inner surface of the segment casing.

8. The turbine shroud segment of claim 7, wherein the effusion passages are angled at 1 to 15 o with respect to the radially inner surface of the segment casing.

9. The turbine shroud segment of claim 1, wherein the effusion passages are entered via recessed portions in the impingement chamber core surface of the segment casing.

10. The turbine shroud segment of claim 9, wherein a portion of the wall surrounding the entrance of the recessed portions in the impingement chamber core surface is thickened.

11. The turbine shroud segment of claim 1, wherein the effusion passages are curved.

12. The turbine shroud segment of claim 1, wherein the effusion passage has an effusion passage inlet that is formed in the impingement chamber core surface of the turbine shroud segment and an effusion passage outlet that is formed in the radially inner surface of the turbine shroud segment, the effusion passage inlet being rounded to facilitate fluid flow.

13. The turbine shroud segment of claim 1, wherein the transfer passages and/or the impingement passages include powder removal funnels.

14. The turbine shroud segment of claim 13, wherein the powder removal funnels are frustoconical in shape, and/or have a rectangular base.

15. The turbine shroud segment of claim 1, wherein an effusion passage flow collar is located between the impingement chamber and the effusion passage.

16. The turbine shroud segment of claim 1, which is formed as a single unitary component by an additive layer manufacturing process.

17. A gas turbine engine that includes at least one turbine shroud segment according to claim 1.

18. A method for manufacturing a turbine shroud segment, the method comprising forming a turbine shroud segment according to claim 1, by additive layer manufacturing.

* * * * *